(12) United States Patent
Lin et al.

(10) Patent No.: US 6,999,007 B2
(45) Date of Patent: Feb. 14, 2006

(54) LINEAR POSITION SENSOR

(75) Inventors: Yingjie Lin, El Paso, TX (US); Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 441 days.

(21) Appl. No.: 10/438,557

(22) Filed: May 15, 2003

(65) Prior Publication Data

US 2004/0227644 A1 Nov. 18, 2004

(51) Int. Cl.
*H03M 3/00* (2006.01)

(52) U.S. Cl. .............................. 341/20; 341/5; 341/15; 336/129; 336/130; 178/18.06; 178/18.07; 178/20.04; 324/207.22; 324/207.24

(58) Field of Classification Search ..................... 341/5, 341/15, 20; 336/129, 130; 178/18.06, 18.07, 178/20.04; 324/207.22, 207.24

See application file for complete search history.

(56) References Cited

U.S. PATENT DOCUMENTS

| | | | | |
|---|---|---|---|---|
| 5,088,928 A | * | 2/1992 | Chan | 434/339 |
| 5,129,654 A | * | 7/1992 | Bogner | 273/238 |
| 5,187,389 A | * | 2/1993 | Hall et al. | 327/50 |
| 5,188,368 A | * | 2/1993 | Ryan | 273/237 |
| 5,381,091 A | * | 1/1995 | Kobayashi et al. | 324/207.17 |
| 5,406,155 A | * | 4/1995 | Persson | 310/68 B |
| 5,486,731 A | * | 1/1996 | Masaki et al. | 310/180 |
| 5,619,431 A | * | 4/1997 | Oda | 702/150 |
| 5,693,993 A | * | 12/1997 | Ito et al. | 310/68 B |
| 5,748,110 A | * | 5/1998 | Sekizawa et al. | 341/5 |
| 5,783,940 A | * | 7/1998 | Kolomeitsev | 324/207.25 |
| 5,815,091 A | * | 9/1998 | Dames et al. | 340/870.34 |
| 6,124,708 A | * | 9/2000 | Dames | 324/207.12 |
| 6,469,497 B2 | | 10/2002 | Schroeder | 324/207.24 |
| 6,498,482 B2 | | 12/2002 | Schroeder | 324/207.21 |
| 6,577,123 B2 | | 6/2003 | Schroeder et al. | 324/207.12 |

* cited by examiner

*Primary Examiner*—Albert K. Wong
(74) *Attorney, Agent, or Firm*—Jimmy L. Funke (57) ABSTRACT

In a linear position encoder, a support is provided upon which a pair of phase quadrature windings are mounted. The windings are arranged to have a sinusoidal magnetic sensitivity characteristic along the length of the support. Mounted on a movable element there is a resonant circuit including a coil and capacitor that can magnetically couple with the windings. When the circuit is excited, it induces currents in the windings that are dependent upon the position of the circuit within a period $T_s$ of the windings. An excitation and processing unit is provided to energize the circuit and to process the signals induced in the windings. The excitation and processing unit is operably coupled to an external high permeability rod extending along the measurement path in a first plane having the windings but removed therefrom. The rod has first and second excitation coils connected in series and wound around the rod and disposed at opposite ends defining a length of the rod.

28 Claims, 6 Drawing Sheets

LINEAR POSITION SENSOR

BACKGROUND

The present invention relates to linear position encoders generally. The invention has particular although not exclusive relevance to non-contact linear position encoders. The invention is particularly suited for use in systems where there may be electromagnetic interference, particularly when used in automotive applications.

Figure 1:
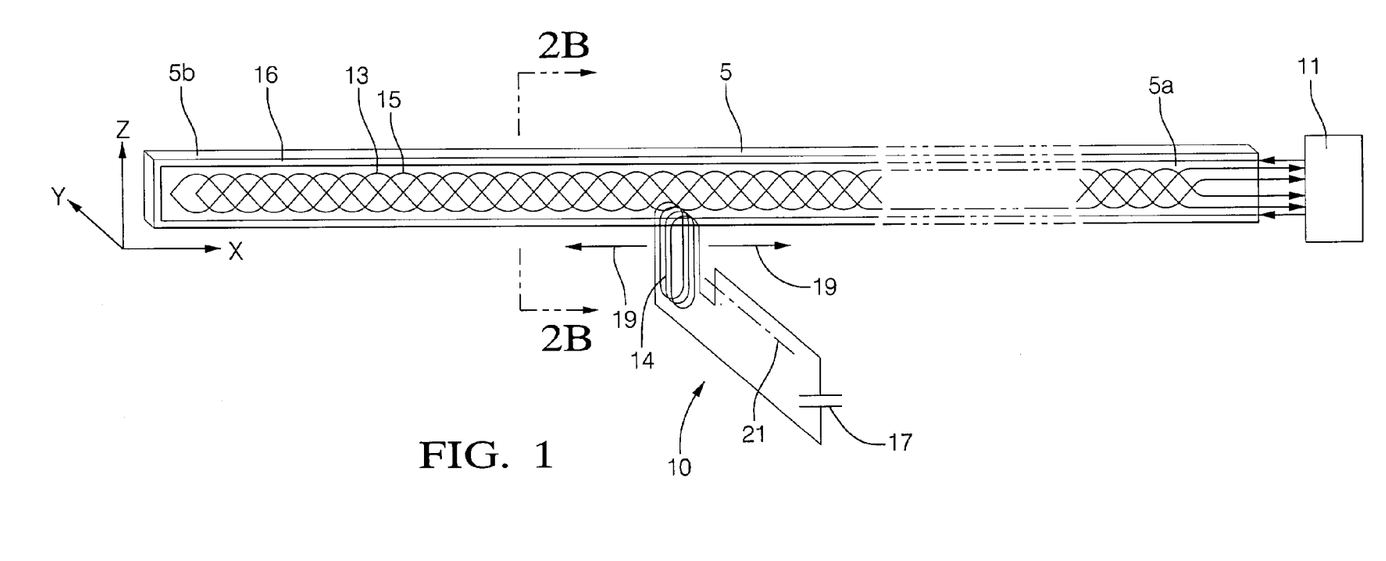
FIG. 1 is a perspective view of a linear positioning encoder of the prior art.

Many types of non-contact linear position sensors have been proposed. A system similar to the present invention is described in U.S. Pat. No. 5,815,091 which is incorporated herein in its entirety by reference. In particular, U.S. Pat. No. 5,815,091 discloses a system for use as a linear position encoder. The basic layout of U.S. Pat. No. 5,815,091 is illustrated in FIG. 1. FIG. 1 shows an outside trace 16 which is connected to a signal generator 11 that generates a trace signal typically in the 0.1 to 10 MHz. range. This outside trace 16 becomes the excitation trace. When an excitation signal is generated in the excitation trace, an output from a pair of phase quadrature conductive windings 13 and 15 depicted as sine and cosine traces is zero volts if perfect symmetry is observed. When a circuit 10 which is resonate at the excitation frequency is placed over the circuit board having the sine and cosine traces the symmetry is distributed and signals are induced into the sine and cosine traces. The voltage level of the signals at the outputs of corresponding sine and cosine traces are the sine and cosine representative of the linear position of the resonate circuit 10 with respect to the stationary printed sine and cosine traces.

The system determines the position of the movable element (i.e., resonant circuit) relative to the stationary element (i.e., circuit board) by utilizing the variation in mutual inductance between the coil and the plurality of sine and cosine wave windings. More specifically, when the power source energizes the coil, a large voltage signal is induced in a sine and cosine wave windings if the coil is adjacent a high part thereof. Only a small voltage signal is induced in a winding if the coil is adjacent a low part thereof. Therefore, the However, this system has a number of disadvantages that pose real world problems when implemented for use, particularly in automotive applications. Firstly, the system is not "balanced", i.e. it is not immune to electromagnetic interference. The flux from the excitation loop trace easily interacts with conductive materials in its proximity.

Secondly, the ability to get a null or zero signal at the outputs of the sine and cosine traces without the resonate circuit present varies with the mounting conditions and nearby objects. Thirdly, the resonate frequency of the moveable board will change with temperature and the presence of nearby conductive objects with respect to the excitation frequency which will greatly change the induced signal.

SUMMARY OF THE INVENTION

When used as a translational position encoder, the invention may comprise a rack and pinion steering assembly having means for indicating the racks relative position for vehicle steering, said means being relative position indicating apparatus as aforesaid. The translational position encoder may be used to determine the relative position of other fixed and movable members in engineering and automotive systems.

In one embodiment, a position detector includes a sensing circuit extending over a measurement path for sensing alternating magnetic field oriented in a predetermined direction; an energizing circuit, different from the sensing circuit, for generating an energizing alternating magnetic field. The energizing circuit includes an external high permeability rod extending along the measurement path in a first plane having the sensing circuit but removed therefrom. The rod has first and second excitation coils connected in series and wound around said rod disposed at opposite ends defining a length of the rod. The detector also includes a resonator electromagnetically coupled to the sensing circuit and energizing circuit. At least one of the resonator and the sensing circuit are mounted for relative movement with respect to the other over the measurement path in the first plane that is substantially parallel to the predetermined direction. The resonator is operable, upon energization of the energizing circuit, to resonate and to generate an alternating magnetic field whose magnetic axis lies substantially in the predetermined direction, which resonator magnetic field induces an alternating signal in the sensing circuit. The resonator and sensing circuit are arranged so that the amount of electromagnetic coupling therebetween varies sinusoidally as a function of their relative positions, thereby causing the amplitude of the signal induced in the sensing circuit by the resonator magnetic field to vary in a similar sinusoidal manner as a function of the position of the resonator relative to the sensing circuit.

A method is also disclosed for detecting the position of first and second members which are mounted for relative movement along a measuring path. The method employs the position detector disclosed above.

The above described and other features are exemplified by the following figures and detailed description.

BRIEF DESCRIPTION OF THE DRAWINGS

Referring now to the figures wherein the like elements are numbered alike.

DETAILED DESCRIPTION

Figure 2:
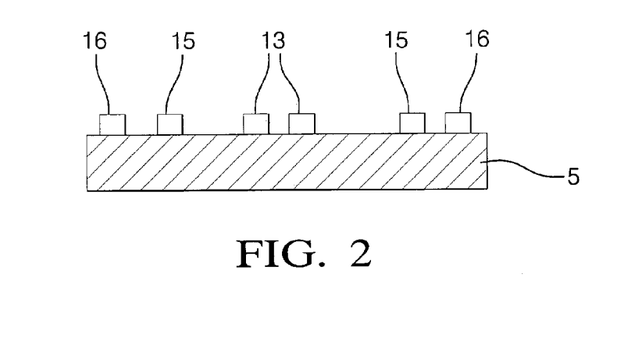
FIG. 2 is an n end view of a cross section cut from a position encoder track forming part of the encoder of FIG. 1.
Figure 3:
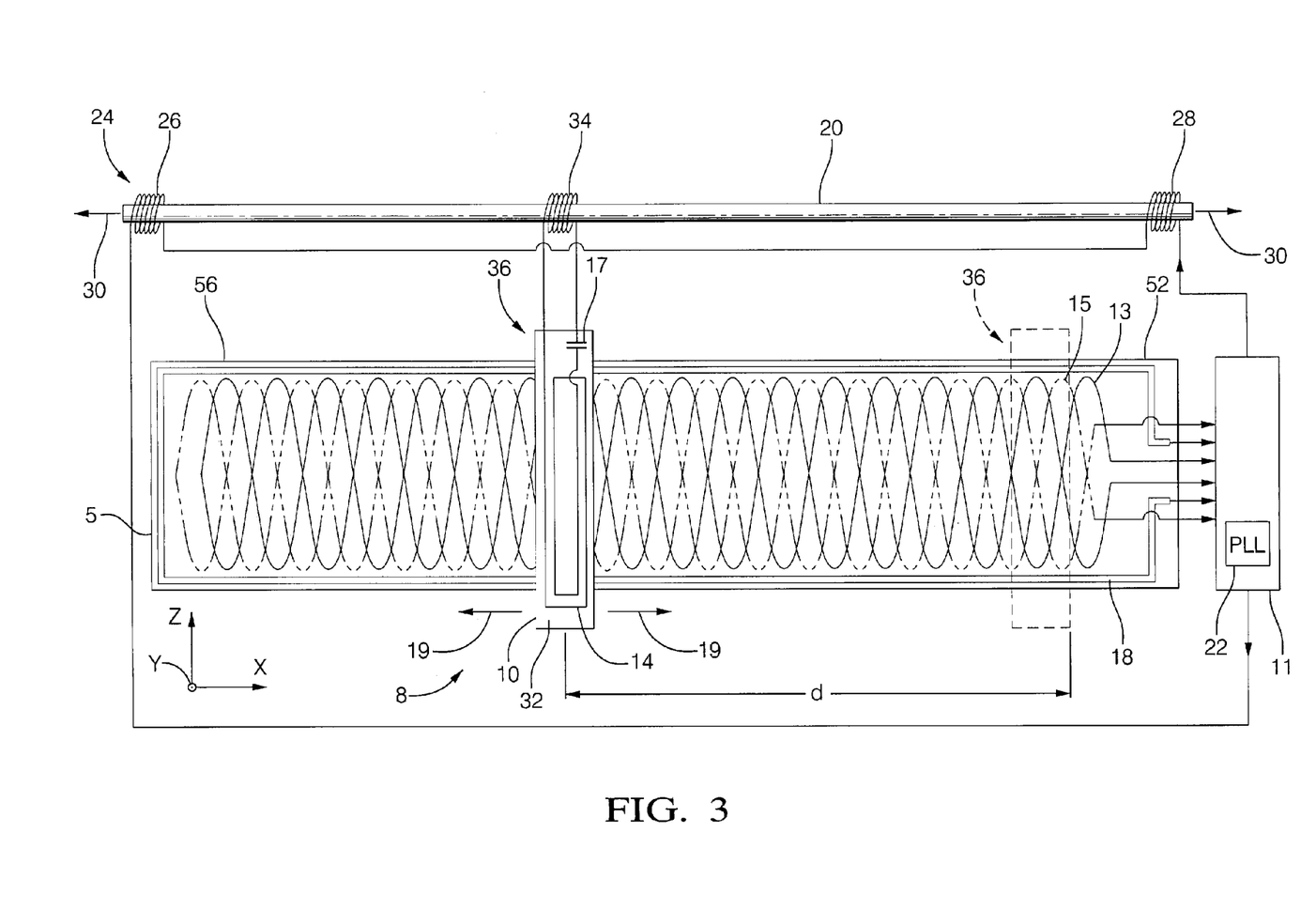
FIG. 3 is a plan view of an exemplary embodiment of a linear position encoder of the present invention.
Figure 4:
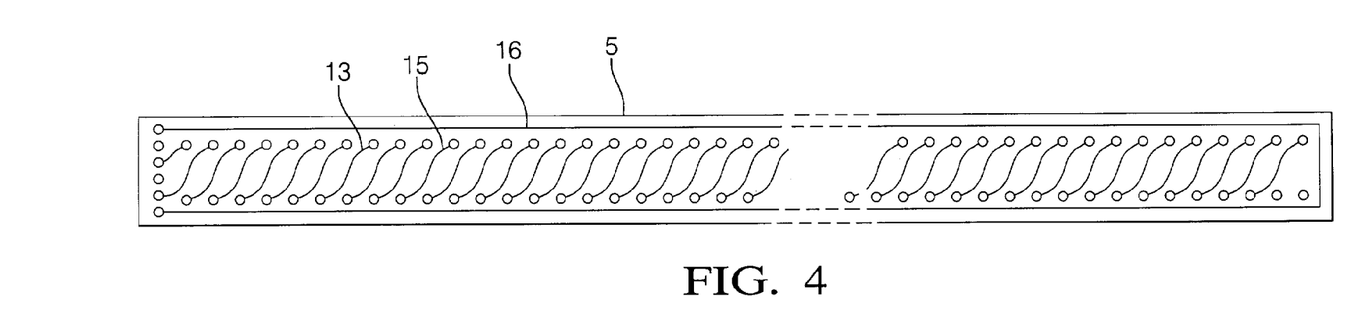
FIGS. 4 and 5 are layers of printed conductors from which a practical encoder track may be formed.
Figure 5:
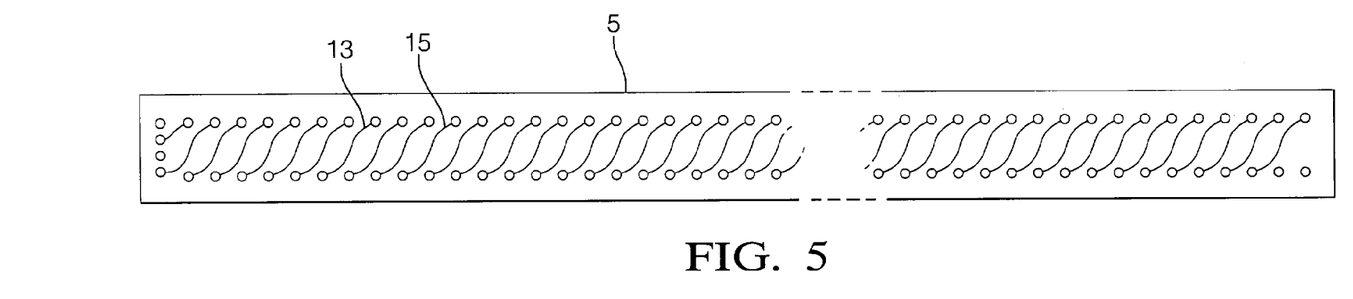
Figure 6:
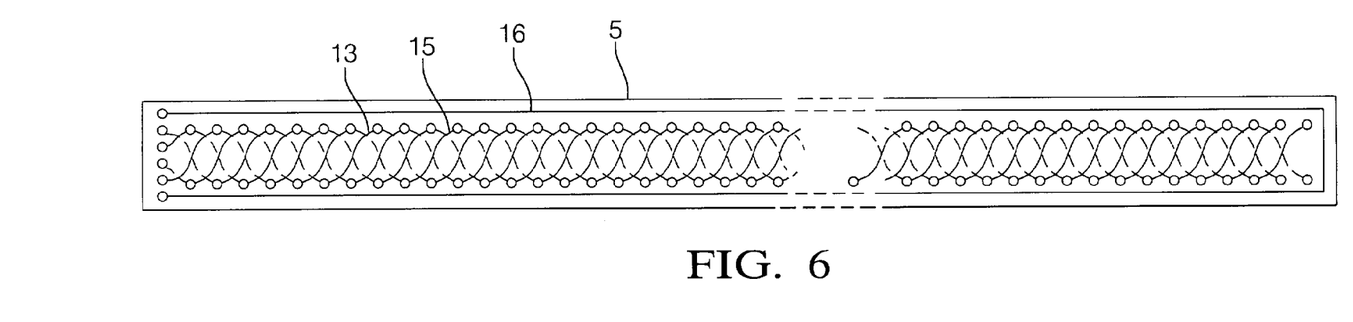
FIG. 6 is a diagrammatic view of the resulting 2-layer printed encoder track.

FIG. 2 is a cross section view and FIG. 3 is a plan view of a linear position sensor 8 embodying the present invention. As shown in FIGS. 2 and 3, there are a pair of sine and cosine phase quadrature conductive windings 13 and 15, respectively, and a feedback trace loop 18 mounted on a support 5 and described more fully herein. In a simple form as illustrated in FIG. 3, windings 13, 15 and the feedback loop 16 optionally take the form of insulated wires of copper or other conductor adhered e.g. by an epoxy adhesive in the required pattern onto a substrate 5 of fiberglass or other flat insulating sheet material. In a more developed form as shown in FIGS. 4–6 conductive patterns are formed in successive printed circuit board layers which are shown in FIGS. 4 and 5, each layer having conductors in a printed pattern as shown and extending between via holes. When the two layers are superimposed and connected through the via holes as shown in FIG. 6 there is obtained a track of the required sinusoidal or "spiral" configuration. The same principle can be used to provide additional layers e.g. of other "spiral" conductors or coarse position indicating tracks as described in more detailed below.

Still referring to FIG. 3, each winding 13 and 15 starts from one end 5a of support 5 and follows a sinuous path therealong until it reaches the other end 5b, where it returns back along support 5 following a sinuous path to the starting end 5a. The sinusoidal forward and return paths that form each winding 13 and 15 have period $T_s$ and are in antiphase, i.e. they are substantially 180° out of phase. The windings 13 and 15 shown in FIG. 3 and described above, will hereinafter be referred to as "sine and cosine windings" since they visually resemble a sine and cosine waveforms relative to one another. The sine and cosine windings 13 and 15 are insulated from each other, either by using via holes to the other side of the support 5 at the cross-over points, or by using a laminated conductor-insulator structure. If a laminate structure is used, the support 5 should be non-magnetic and preferably non-conducting for reasons that will become apparent later. The sine and cosine windings 13 and 15 may be formed using any conductive wire, but are preferably formed by etching or other standard printed circuit board technique. The feedback loop 18 runs around the periphery of the support 5 and may comprise a single loop of conductor or alternatively may comprise many turns of conductive wire.

Each end of the sine and cosine windings 13 and 15 and the feedback loop 18 are connected to the excitation and processing unit 11. As those skilled in the art will realize, in practice the excitation and processing circuit 11 can be provided by a power source and a single semiconductor integrated chip.

FIG. 3 also shows coils of wire 14 and 34, and a capacitor 17 that together form a resonant circuit. Printed coil 14 and capacitor 17 are on board 10 that are mounted above board 5 as shown. As represented by arrows 19 and 30, the resonant circuit board 10 is free to move along the length of the support 5, i.e. along the x-axis of FIG. 3. Likewise, coil 34 is free to move along the length of ferrite rod 20. Preferably, an axis of the coil 14 is orthogonal to the surface of the support 5 on which the sine and cosine windings 13 and 15 are mounted, as this provides the greatest magnetic coupling between the spiral windings 13 and 15 and the coil 14.

Figure 7:
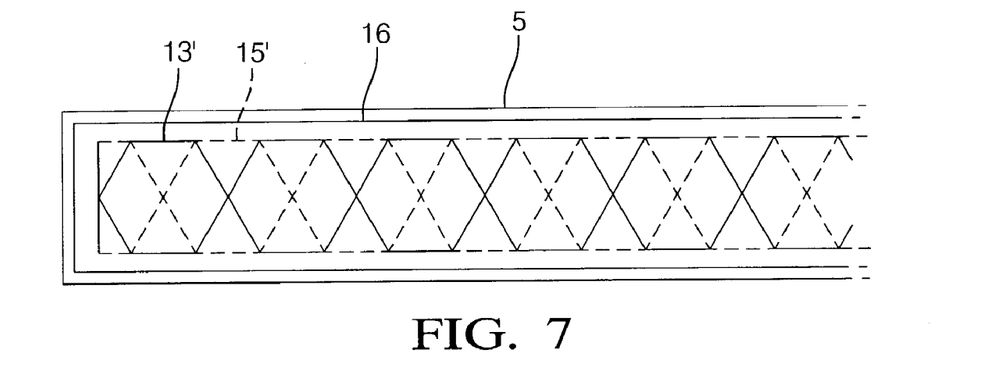
FIGS. 7–9 show alternative configurations of the conductors that form the encoder track.
Figure 8:
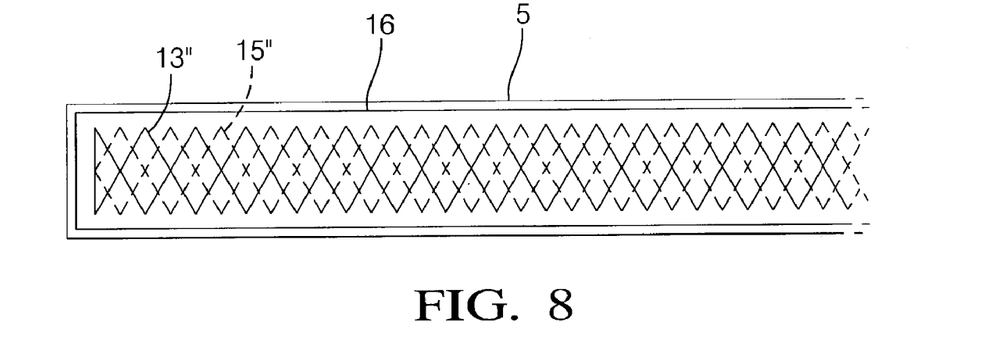
Figure 9:
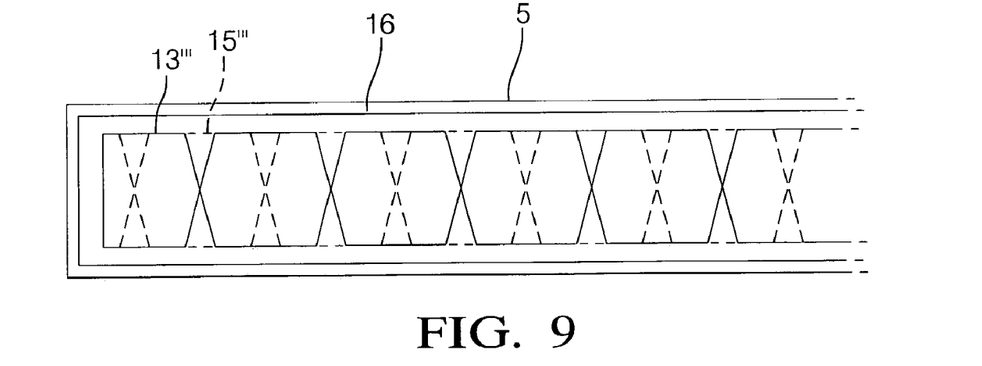

FIGS. 7, 8, and 9 show alternative configurations of the windings. In FIG. 7 the windings have, when viewed overall, a hexagonal configuration, in FIG. 8 they are triangular and in FIG. 9 they are square waves.

Attempts to use the prior art design having the excitation loop in the printed circuit board for automotive use has been met with failure. In this disclosure, the excitation loop of the prior art is removed from the printed circuit board to an external high permeability rod 20, such as ferrite, for example, which traps the generated flux. This configuration always provides a zero or null condition without resonate circuit board 10 being present. This configuration also incorporates use of a phase locked loop (PLL) 22 to adjust the excitation frequency to match the resonate frequency of the moveable resonant circuit board 10.

More specifically in an exemplary embodiment, an excitation magnetic loop 24 is removed from the printed circuit board 5 which has the printed sine and cosine traces 13 and 15, respectively. The new excitation circuit utilizes two coils 26 and 28 connected in series and placed at either end of rod 20 having a high permeability core and has little interaction with materials proximate thereto. Excitation coils 26 and 28 are wound in first planes corresponding to the z-axis and placed at a right angle to a second plane corresponding to a plane having the sine and cosine printed traces 13, 15 and an axis 30 of rod 20 lying therein corresponding to a plane defining PCB 5 which greatly reduces any unwanted interactions between the two elements.

In an exemplary embodiment and still referring to FIG. 3, coil 14 and capacitor 17 are preferably mounted on a PCB 32 and coil 14 is connected in series with a coil 34. Capacitor 17 is connected across the total inductance of coil 14 and coil 34 to form a resonant tank circuit generally shown at 36. Coil 34 is wound on a bobbin (not shown) around rod 20 such that it can move along the high permeability rod 20 between coils 26 and 28. Coil 14 is preferably a planer coil typically of printed circuit board construction which is mechanically as well as electrically connected to coil 34.

In operation, coil 34 picks up energy from the rod 20 and coil 14 inductively couples the energy into the printed traces 13 and 15. The excitation drive is generated by a phase locked loop (PLL) 22 circuit which is initially oscillating near the designed resonate frequency of the moveable resonate circuit 36. PLL 22 circuit is preferably an integrated circuit chip and is more preferably integrated with the excitation and processing unit 11 as shown in FIG. 3. The initial frequency is picked up by the feedback trace 18 and is connected to the PLL 22. The feedback trace loop 18 to PLL 22 completes the loop and causes the frequency of the PLL 22 to change until the PLL frequency matches and phase locks to the frequency of the moveable resonate circuit 36.

As the ambient temperature changes, the electrical properties of resonate tank circuit 36 elements change and affect the resonant frequency of circuit 36. PLL 22 in turn is configured to change the excitation frequency to match the new temperature dependent resonate frequency of tank circuit 36. Matching the excitation frequency in magnetic loop 24 to the resonate frequency of the moveable tank circuit 36 assures maximum transfer of energy to the printed sine and cosine traces 63, 65 on stationary board 5 with reference to FIG. 11.

If a multilayer printed circuit board is used for the sine and cosine trace board 5 then the sines and cosines of different periods can be printed on the same board. If the sines and cosines of different periods are used then course and fine resolutions are available (See FIG. 11).

If the high and low frequency printed periods are not related by an integer then the physical phase relationship between the printed high and low frequency traces changes with linear position and very long position encoders can be constructed with very high resolution. In particular, if there are multiple periods of the low frequency period, then the low and the high frequency periods must not have an integer relationship. For example, if there were 5 low frequency periods and the ration between high and low was 5:1, then the low and high frequency periods are back in phase after one period of low frequency. More specifically, the high frequency goes through 5 five periods and the two different frequencies are back in phase and cycle repeats for every low period cycle. Thus, there is no way to determine which of the multiple low frequency periods the encoder is in. If, however, the ratio is 5.2:1, then after one low frequency period the high has gone 5.2 cycles. It takes in this case, five low frequency periods before the low and high frequencies are in phase again.

Figure 11:
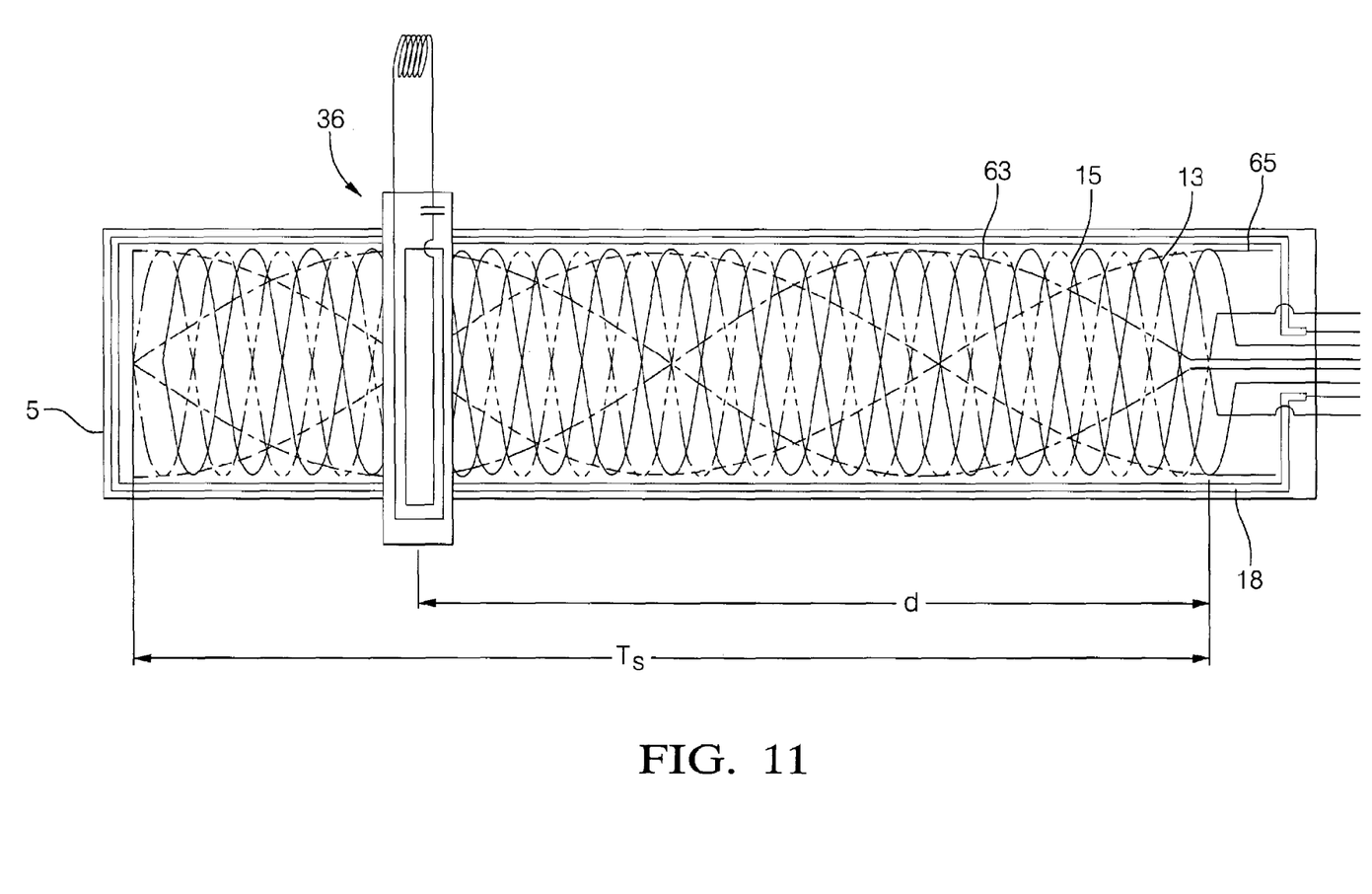
FIG. 11 is a plan view of fine quadrature spiral windings on the circuit board of FIG. 3 having a set of course quadrature spiral windings superimposed thereon.

The operation of the sensor system shown in FIGS. 3 and 11 will now be briefly described. When the position of coil 14 along the x-axis relative to the support 5 is to be determined, excitation current is applied to the excitation magnetic loop 24 from excitation processing unit 11. The frequency of the excitation will lock at the resonate frequency of coil 14 of resonant circuit 36 inducing a voltage in each sine and cosine windings 63 and 65. (See FIG. 11.) The magnitude of the voltage induced is dependent upon the position of the resonant circuit 36 along the x-axis. Therefore, by suitable processing of the voltages induced in the sine and cosine windings 63 and 65, the position of the resonant circuit 36 within a period of the windings 63 and 65 can be determined. As will become apparent later, two phase quadrature spiral windings are required to give unambiguous readings over the whole period $T_s$ of the sine and cosine windings 63 and 65. In the present embodiment, absolute position is determined by using one period low frequency sine and cosine traces 63, 65 and a multiple period high frequency sine and cosine traces 13, 15. For long encoders having high accuracy, a multiple period low frequency sine and cosine traces 63, 65 with a non-integer ratio between the high and low frequency traces is used as described above.

Although the operation of the circuit described above is in many respects similar to that of U.S. Pat. No. 5,815,091 for sensing linear displacement, using the sine and cosine windings 63 and 65 with removed excitation loop 24 provides several advantages. In particular, by removing the excitation from board support 5 to an external high permeability rod, such as a ferrite rod, the generated flux is trapped in the ferrite rod. The use of PLL 22 also allows matching the excitation frequency to the resonant frequency that is temperature dependent. Lastly, this design always provides a null or balanced circuit in the absence of resonant circuit 36.

It ill be recognized that since the windings 63 and 65 are not digital in nature, i.e. they are continuously varying along the length of the support 5, the resolution of the system has a theoretical infinite setability. In practice, however, the output signals are processed digitally and the resolution of the analog-to-digital converter (ADC) in the processing circuitry which digitizes the signals from windings 63, 65 will contribute to the resolution of the system. In addition, the system is relatively insensitive to dirt, dust, grease etc. that can affect the proper operation of optical type position sensors.

Figure 10:
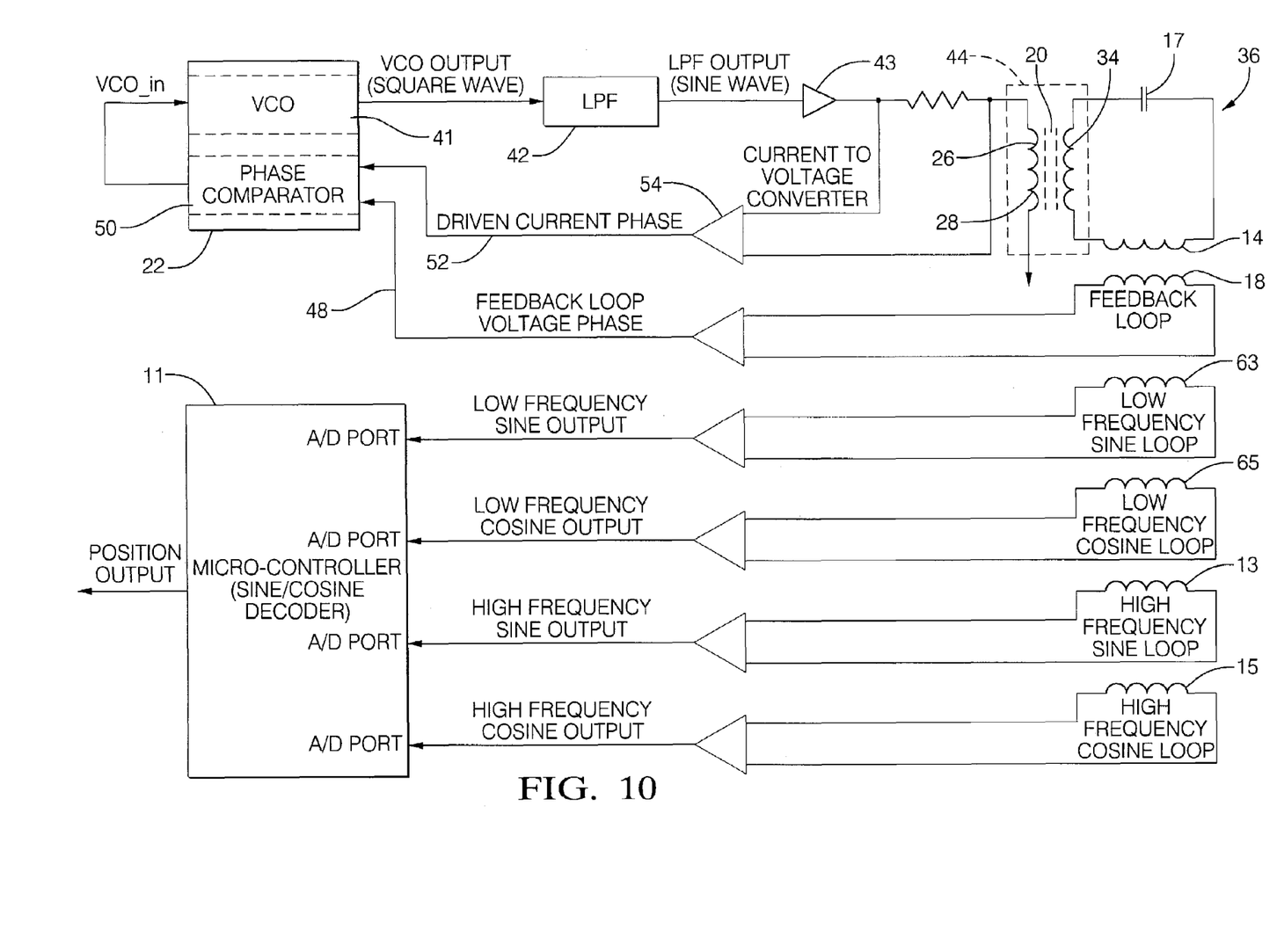
FIG. 10 is a schematic representation of preferred excitation and processing circuitry used to determine the position of the resonant circuit relative to the encoder track of FIG. 3.

To determine where along the length of the sine and cosine spiral windings the resonant circuit 36 is, i.e. to determine the value of d within the measurement range $T_s$, the signals from the sine and cosine windings 63 and 65 are processed in the excitation and processing unit 11 (See FIG. 11 illustrating circuit 36). FIG. 10 schematically shows excitation and processing circuitry that may be used to calculate the position of the resonant circuit 36 within the period $T_s$ of the sine and cosine windings 63 and 65. As shown in FIG. 10 there is a signal generator 41 that generates the excitation signal as a voltage controlled output (VCO) that is applied to the excitation loop 24 via a low pass filter (LPF) 42, buffer 43 and transformer 44. More specifically, the excitation drive is generated by PLL 22 which is initially oscillating at a preselected resonant frequency of moveable resonant circuit 36. The initial frequency 48 is picked up by the feedback trace loop 18 via coil 28 and connected to PLL 22 via a phase comparator 50 that also receives a driven current phase signal 52 from a current to voltage converter 54. The feedback to PLL 22 completes the loop and causes the frequency of PLL 22 to change until the PLL frequency matches and phase locks to the frequency of the moveable circuit 36 as indicated by VCO_in in FIG. 10. As temperature changes the electrical properties of the elements of resonant circuit 36 change. PLL 22 changes frequency to match the new resonant frequency of moveable tank circuit 36. The excitation and processing circuit shown in FIG. 10 and described above is given by way of example only and should not be construed as limiting in any way.

Theoretically, the sine and cosine windings 63 and 65, respectively, can have any period $T_s$, and therefore the sensor can be of any length. However, as the period $T_s$ of the windings increases, the resolution to which the detector can detect changes in position decreases. The reason is that small changes in position of the resonant circuit 36 within the period $T_s$ of the sine and cosine windings only produce small changes in the sensor signals. Whether these small changes are detected or not, depends on the resolution of the analog-to-digital converter used in the processing circuitry, the signal to noise ratio of the received signal and the spatial accuracy of the windings. Usually, for a given application, the resolution of the ADC is fixed by other system parameters or by cost. Increased accuracy and resolution can be obtained by adding a set of higher frequency printed sine and cosine traces 13, 15. The increased accuracy and resolution will closely follow the ratio of low to high frequency. The practical maximum frequency occurs when the printed length of a high frequency period is twice the width of printed coil 14.

In the exemplary embodiments described above, a coarse and fine set of spiral windings along the length of the sensor are used to allow the system to keep track of the absolute position of the resonant circuit. An example of such an arrangement is schematically shown in FIG. 10 and illustrated in FIG. 11 which show part of a 2.4 m long support 5 which has a set of fine quadrature spiral windings 13 and 15 with period 200 mm, for example, and a set of coarse quadrature spiral windings 63 and 65 with one period of 2.4 m, for example, mounted thereon. The signals from the coarse spiral windings 63, 65 are used to determine the position of the resonant circuit within the coarse spiral period (the measurement range, i.e., between start and end), and the signals from the fine windings 13, 15 are used to improve the measurement accuracy and resolution. As shown in FIG. 11 the fine and coarse set of windings 13, 15 and 63, 65 are superimposed on top of each other, and as in one embodiment, vias or the like are used at the conductor cross overs. For this solution to work, the coarse windings should be able to distinguish between the periods of the fine windings. If this is not possible, then one or more intermediate periodicity windings should be used.

The transducer of the present invention may be applied to a number of applications. Applications include valve position sensing, positioning of the rack in a rack and pinion steering system, cranes, shock absorber/ride height sensors and the like.

While the invention has been described with reference to an exemplary embodiment, it will be understood that by those skilled in the art the various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A position detector comprising:
   a sensing circuit extending over a measurement path for sensing alternating magnetic field oriented in a predetermined direction;
   an energizing circuit, different from said sensing circuit, for generating an energizing alternating magnetic field, said energizing circuit having an external high permeability rod extending along said measurement path in a first plane having said sensing circuit but removed therefrom, said rod having first and second excitation coils connected in series and wound around said rod and disposed at opposite ends defining a length of said rod; and
   a resonator electromagnetically coupled to said sensing circuit and said energizing circuit;
   at least one of the resonator and the sensing circuit being mounted for relative movement with respect to the other over said measurement path in said first plane that is substantially parallel to said predetermined direction;
   said resonator being operable, upon energization by said energizing circuit, to resonate and to generate an alternating magnetic field whose magnetic axis lies substantially in said predetermined direction, which resonator magnetic field induces an alternating signal in said sensing circuit;
   said resonator and said sensing circuit being arranged so that the amount of electromagnetic coupling therebetween varies sinusoidally as a function of their relative positions, thereby causing the amplitude of said signal induced in said sensing circuit by said resonator magnetic field to vary in a similar sinusoidal manner as a function of the position of the resonator relative to the sensing circuit.

2. The position detector of claim 1, wherein said resonator includes a third coil, a fourth coil, and a capacitor connected in series, said third coil is wound around said rod intermediate said first and second excitation coils such that said third coil can move therebetween.

3. The position detector of claim 2, wherein said fourth coil is a planar coil in a second plane substantially parallel to said first plane.

4. The position detector of claim 1, wherein said rod is a ferrite rod.

5. The position detector of claim 1, wherein said first, second, and third coils are wound around an axis defining said rod that is generally planar with said first plane.

6. The position detector of claim 1, wherein said sensing circuit and said energizing circuit are operably connected to a phase lock loop (PLL) circuit for driving said energizing circuit.

7. The position detector of claim 6, wherein said sensing circuit includes a feedback loop operably connected to said PLL circuit.

8. The position detector of claim 7, wherein PLL circuit is configured to oscillate at an initial excitation frequency near a designed resonant frequency of said resonator, said feedback loop configured to pickup said initial excitation frequency and provide to said PLL circuit, said PLL circuit configured to change said initial excitation frequency to a new excitation frequency to match and phase lock to a frequency of said resonator.

9. The position detector of claim 8, wherein said PLL circuit is configured to change said new excitation frequency based on temperature dependency of elements forming said resonator.

10. The position detector of claim 6, wherein said sensing circuit comprises:
    a first printed circuit board (PCB);
    a feedback trace loop disposed on said first PCB, said feedback trace loop proximate an edge defining said first PCB;
    a first trace loop disposed on said first PCB, said first trace loop disposed within said feedback trace loop along said measurement path; and
    a second trace loop disposed on said first PCB, said second trace loop disposed within said feedback trace loop along said measurement path overlapping said first trace loop, said feedback trace loop, first trace loop and second trace loop operably connected to said PLL circuit.

11. The position detector of claim 10, wherein said resonator comprises:
    a second printed circuit board (PCB);
    a third coil wound around said rod intermediate said first and second excitation coils such that said third coil can move therebetween;
    a fourth coil traced on said second PCB and serially connected to said third coil; and
    a capacitor serially connected to said third coil and fourth coil;
    wherein, said second PCB is substantially parallel to said first PCB and translatable along said measurement path.

12. The position detector of claim 11, wherein said PLL circuit includes processing means for processing a signal induced in said feedback trace loop, first trace loop and second trace loop for providing an indication therefrom of the relative position of said first and second PCB's.

13. The position detector of claim 12, wherein said first PCB is fixed and said second PCB is movable with respect to said first PCB.

14. The position detector of claim 13, wherein said feedback, first, and second trace loops lie in substantially the same plane, and wherein said resonator is movable relative to said feedback, first and second trace loops in a plane which is substantially parallel to said first plane in which said first and second trace loops lie.

15. The position detector of claim 10, wherein said first and second trace loops have a generally square shape.

16. The position detector of claim 10, wherein said first and second trace loops have a generally diamond shape.

17. The position detector of claim 10, wherein said first and second trace loops have a generally hexagonal shape.

18. The position detector of claim 10, wherein said first and second trace loops are constituted by opposed sinusoidal convolutions of conductor.

19. The position detector of claim 10, wherein said first PCB comprises a plurality of said sensing circuits which are electrically separate from each other and are located one on the other, and wherein a plurality of loops of the respective sensing circuits are spatially separated along said path.

20. The position detector of claim 10, wherein said sensing circuit comprises more than two of said first and second trace loops which are arranged in succession along said path.

21. The position detector of claim 20, further comprising coarse positioning conductor means for identifying within which adjacent two loops of said sensing circuit and said resonant device is located.

22. The position detector of claim 20, further comprising coarse positioning conductor means for identifying within which adjacent two loops of said sensing circuit said resonant device is located.

23. The position detector of claim 1, wherein said measurement path is linear.

24. A method of detecting the position of first and second members which are mounted for relative movement along a measuring path, the method comprising:
providing a first circuit on said first member, the first circuit having at least two loops arranged in succession along said path, each loop extending along said path and said loops being connected in series and being arranged so that EMFs induced in adjacent said loops by a common background alternating magnetic field oppose each other;
providing a second circuit which extends along said measuring path on said first member;
providing an electromagnetic resonant device on said second member for interacting with said circuits such that in response to an input driving signal being applied to one of said circuits, an intermediate signal is induced in said electromagnetic resonant device, which intermediate signal induces in the other circuit an output signal which continuously varies as a function of the position along said path of said resonant device relative to said at least two loops of said first circuit;
applying said driving signal to one of said circuits from an energizing circuit, different from said circuits, for generating an energizing alternating magnetic field, said energizing circuit having an external high permeability rod extending along said measuring path in a first plane having said first member but removed therefrom, said rod having first and second excitation coils connected in series and wound around said rod and disposed at opposite ends defining a length of said rod; and
detecting the signal induced in said other circuit and deriving therefrom the relative positions of said first and second members.

25. The method of claim 24 wherein said driving signal comprises an alternating signal having a frequency in the range of 10 kHz to 1 MHz.

26. The method according to claim 24, wherein said applying said driving signal applies a burst of said driving signal, and wherein said detecting step detects the signals induced in said other circuit after said burst of driving signal has been applied.

27. A position detector comprising:
a sensor comprising first and second sensing circuits, each extending over a measurement path, said circuits being offset from each other in the measurement path and being operable for sensing alternating magnetic fields;
an energizing circuit, different from said sensing circuits, for generating an energizing alternating magnetic field, said energizing circuit having an external high permeability rod extending along said measurement path in a first plane having said first and second sensing circuits but removed therefrom, said rod having first and second excitation coils connected in series and wound around said rod and disposed at opposite ends defining a length of said rod;
a resonator which is electromagnetically coupled to said sensing circuits and said energizing circuit;
at least one of said sensor and said resonator being mounted for relative movement with respect to the other over said measurement path;
said resonator being operable, upon energization by said energizing circuit, to resonate and to generate an alternating magnetic field which induces an alternating signal in each of said sensing circuits;
said resonator and said sensing circuits being arranged so that the amount of electromagnetic coupling therebetween varies sinusoidally as a function of their relative positions, thereby causing the amplitude of said signal induced in each of said sensing circuits by said resonator magnetic field to vary in a similar sinusoidal manner as a function of the position of the resonator relative to the corresponding sensing circuit;
the amplitude of the signal induced in the first sensing circuit by the magnetic field generated by the resonator being different from the amplitude of the signal induced in the second sensing circuit by the magnetic field generated by the resonator, for a given relative position between the resonator and the sensor, due to the offset between the sensing circuits in the measurement path; and
processing circuit connected to process and to demodulate the alternating signal induced in said first and second sensing circuits by the magnetic field generated by said resonator and to provide a trigonometric ratio of the demodulated signals from the respective first and second sensing circuits, which ratio is indicative of the relative position of said resonator and said first and second sensing circuits.

28. A position detector comprising:
a sensing circuit for sensing alternating magnetic fields and having a sensing conductor lying substantially in a plane and extending over a measurement path;
an energizing circuit, different from said sensing circuit, for generating an energizing alternating magnetic field;
said energizing circuit having an external high permeability rod extending along said measurement path in a first plane having said sensing circuit but removed therefrom, said rod having first and second excitation coils connected in series and wound around said rod and disposed at opposite ends defining a length of said rod, said rod being operable to provide a pulse of said energizing alternating magnetic field during a first time interval;
a self-contained electromagnetic device, electromagnetically coupled to said sensing circuit and said energizing circuit;
at least one of the sensing circuit and the self-contained electromagnetic device being mounted for relative movement with respect to the other over said measurement path in a plane which is substantially parallel to the plane in which said sensing conductor lies;
said self-contained electromagnetic device being operable, upon energization by energizing circuit, to generate an alternating magnetic field which is such as to induce an alternating signal in said sensing circuit;
said self-contained electromagnetic device and said sensing circuit being arranged so that the magnetic coupling therebetween continuously varies as a function of their relative positions, thereby causing the amplitude of said induced signal to continuously vary with the position of the self-contained electromagnetic device relative to the sensing circuit; and
processing circuitry operable to process, during a subsequent second time interval after said first time interval, the signal induced in said sensing circuit by said self-contained electromagnetic device and to provide the relative positions of said sensing circuit and electromagnetic device.

* * * * *